United States Patent [19]

Morgan et al.

[11] 4,349,695
[45] Sep. 14, 1982

[54] RECIPIENT AND MESSAGE AUTHENTICATION METHOD AND SYSTEM

[75] Inventors: Barrie O. Morgan, Dallas; David W. Abmayr, Carrollton, both of Tex.

[73] Assignee: Datotek, Inc., Dallas, Tex.

[21] Appl. No.: 51,903

[22] Filed: Jun. 25, 1979

[51] Int. Cl.³ .............................................. H04L 9/00
[52] U.S. Cl. .............................. 178/22.08; 178/22.09; 340/825.34
[58] Field of Search .................... 178/22, 22.08, 22.09; 235/379, 380, 382; 375/2; 340/149 R, 149 A, 825.34

[56] References Cited

U.S. PATENT DOCUMENTS

| | | | |
|---|---|---|---|
| 3,798,605 | 3/1974 | Feistel | 178/22 |
| 3,956,615 | 5/1976 | Anderson et al. | 178/22 |
| 4,123,747 | 10/1978 | Lancto et al. | 235/380 |
| 4,160,120 | 7/1979 | Barnes et al. | 375/2 |
| 4,193,131 | 3/1980 | Lennon | 375/2 |
| 4,218,738 | 8/1980 | Matyas et al. | 178/22 |
| 4,234,932 | 11/1980 | Gorgens | 235/379 |

FOREIGN PATENT DOCUMENTS 2020513  11/1979  United Kingdom ..................... 375/2

Primary Examiner—Howard A. Birmiel
Attorney, Agent, or Firm—Richards, Harris & Medlock

[57] ABSTRACT

The specification discloses a system and method for authenticating a message recipient prior to transmission of a message and for authenticating the message content after receipt of the message. A randomized character or character sequence is initially enciphered at the authenticator station and stored. The enciphered character is transmitted to the message recipient. The enciphered character is deciphered by the message recipient to reproduce the randomized character. The randomized character is reenciphered by the message recipient and transmitted back to the authenticator station. The reenciphered character is deciphered and the stored randomized character is compared with the deciphered character. The message recipient is authenticated if the stored randomized character exactly compares with the deciphered character. In order to authenticate the message after receipt, polynomial block check characters are accumulated from the message. The block check characters are enciphered according to a predetermined enciphering scheme and transmitted to a remote location, along with the message. The message is received at the remote location and polynomial block check characters are accumulated in response to the received message. Enciphered block check characters are received and deciphered according to the reverse of the predetermined enciphering scheme. The accumulated block check characters are compared with the deciphered block check characters and the message is authenticated if the compared characters are the same.

7 Claims, 5 Drawing Figures

RECIPIENT AND MESSAGE AUTHENTICATION METHOD AND SYSTEM

FIELD OF THE INVENTION

This invention relates to authentication techniques and more particularly relates to a system and method for positively identifying a remote terminal user and a message received thereby.

THE PRIOR ART

It is desirable in many applications to encode or encipher digital data being transmitted from one location to another. For example, banks and other businesses often employ complex digital enciphering techniques in order to encipher messages being transmitted from one location to another in order to prevent unauthorized detection of the data being transmitted therebetween. In addition, it is important that the recipient of a message be authenticated in such applications, such that a message may not be sent to an unauthorized entity. In the past, authentication of a recipient terminal has been achieved by the well-known principle of challenge and response. In such applications utilizing computer terminals, the host computer challenges the remote terminal by asking for a password or identification phrase. The remote terminal must respond with the correct password or identification phrase before being allowed to "log on" to receive the message being transmitted.

The common challenge and response technique has several weaknesses. First, the response from the terminal being authenticated is generally always the same and secondly, the response is sent in clear to the host and is therefore subject to interception and subsequent unauthorized use. With use of such a conventional challenge and response technique, an intruder could monitor the lines at the host and accumulate a table of passwords from the active remote terminals. In addition, the password list utilized with such computer systems is stored in the CPU and is therefore readily accessible to dishonest computer operators. A need has thus arisen for a simple, yet effective, technique for authenticating a prospective message recipient.

In addition to recipient authentication, it is important to authenticate a message in order to protect against unintentional or intentional alteration of the message content through omission, insertion or substitution. A need has thus arisen for an automatic technique in order to provide message authentication, preferably in combination with recipient authentication.

SUMMARY OF THE INVENTION

In accordance with the present invention, a system is provided to authenticate a message recipient. Circuitry is provided at an authenticator station for enciphering a randomized character or character sequence. The randomized character is stored at the authenticator station. The enciphered character is transmitted from the authenticator station to a message recipient. Circuitry is operable by the message recipient to decipher the enciphered character to reproduce the randomized character. The randomized character is reenciphered by the message recipient and transmitted back to the authenticator station. The reenciphered character is deciphered at the authenticator station to produce a deciphered character. The stored randomized character is compared with the deciphered character. An authentication indication is generated if the stored randomized character is identical to the deciphered character.

In accordance with another aspect of the invention, the invention comprises the authentication of a message content after transmission to a remote location. In response to the message, polynomial block check characters are accumulated and are then enciphered according to a predetermined enciphering scheme. The enciphered block check characters are transmitted along with the message to the remote location. At the remote location, the message is received and polynomial block check characters are accumulated in response thereto. The received enciphered block check characters are deciphered according to the reverse of the predetermined enciphering scheme. The accumulated block check characters are compared at the remote location with the deciphered block check characters. An authentication indication is generated if the accumulated and deciphered block check characters are identical to one another.

In accordance with another aspect of the invention, the authentication technique of the present invention is rendered further secure by automatically generating a new starting point for each randomized number generated. The unique cryptographic variables utilized for encryption in accordance with the invention are themselves encrypted and stored prior to use. Further, personal identity numbers are added to the system which must be deciphered prior to proper operation of the system. Further, antispoofing techniques including cipher feedback are utilized in order to prevent spoofing and other unauthorized entry into the system.

DESCRIPTION OF THE DRAWINGS

For a more complete understanding of the present invention, reference is made to the following drawings, in which.

DESCRIPTION OF THE PREFERRED EMBODIMENT

Figure 1:
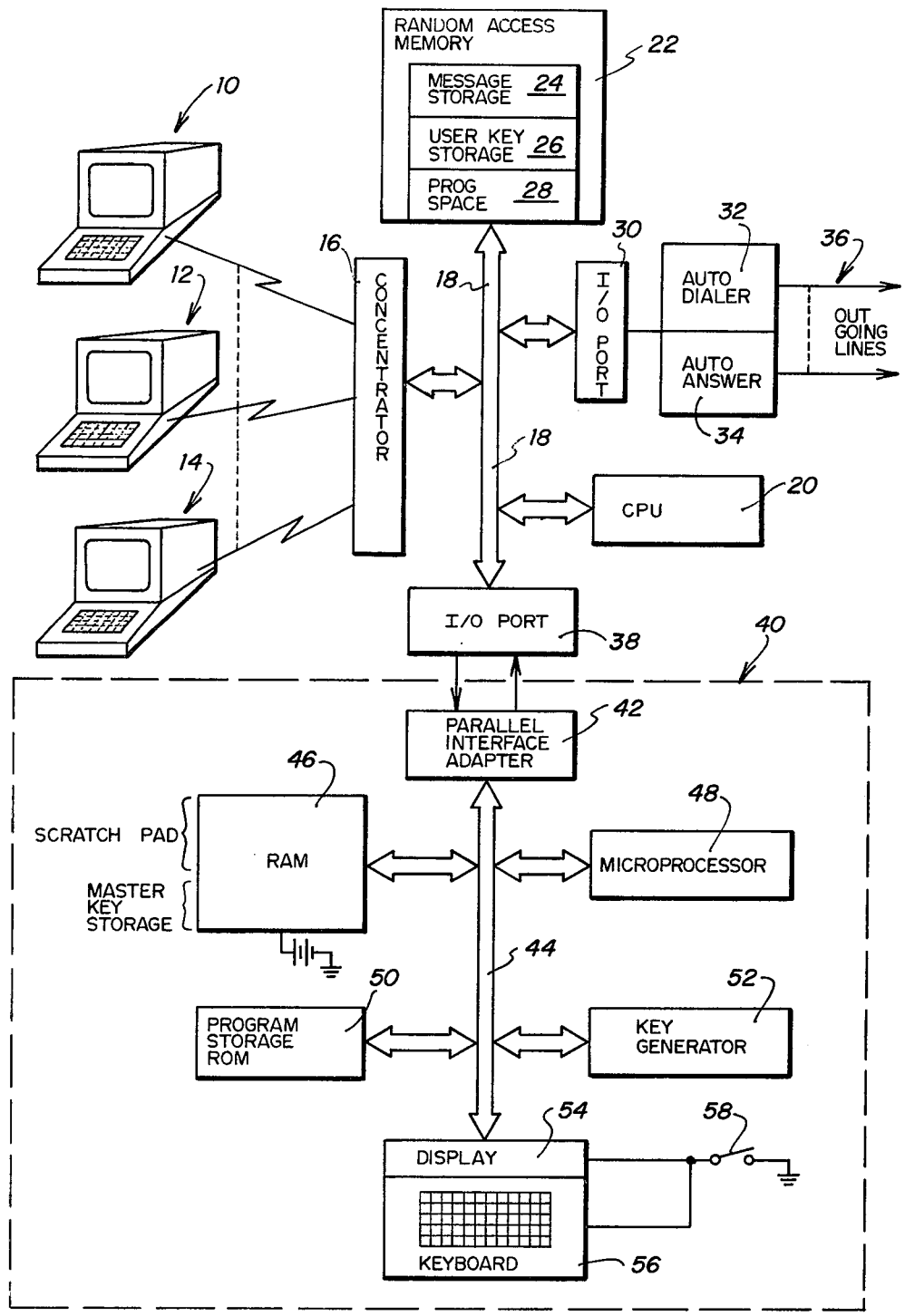
FIG. 1 is a block diagram of the preferred embodiment of the invention.

Referring to FIG. 1, a block electrical diagram of a preferred embodiment of the invention is illustrated. A plurality of terminals 10, 12 and 14 are interconnected to a concentrator circuit 16. The terminals 10-14 may comprise any one of a number of different types of digital data input and output terminals, such as telephones, TWX terminals, teleprinter terminals or the like. Terminals 10-14 may comprise, for example, input and output data terminals utilized at various locations in a bank. The concentrator or multiplexer 16 directs the input and output digital data streams from the terminals to a data bus 18 which interconnects a CPU 20 and a random access memory (RAM) 22. Random access memory 22 includes a message storage 24, a user key storage 26 and a program space 28.

The message storage 24 comprises a plurality of locations in the RAM 22 for enabling queuing up of several messages at a time which are waiting to be processed during peak periods. The stored messages may then be retrieved at later times. The user key storage 26 portion of the RAM 22 stores the user keys, including encrypted keys and encrypted personal identity numbers, to be later described, which are stored for use when required. The program space of the RAM 22 stores the resident programming to enable the desired operation of the CPU 20.

The bus 18 also connects the CPU 20 to an I/O port 30 which connects to an auto dialer 32 and an auto answer 34. Outgoing data lines 36 extend to various remote locations.

The bus 18 is also connected to an I/O port 38 which connects with an authenticator circuit generally identified by the number 40. The authenticator circuit includes a parallel interface adapter 42 which interfaces with a data bus 44. A random access memory (RAM) 46 is connected to the bus 44, as is a microprocessor 48. A program storage read only memory (ROM) 50 is also connected to the bus 44, along with a randomized key generator 52. A display 54 is connected to the bus 44, along with an input keyboard 56. A mechanical switch 58 is provided to enable the loading of a master key into the display 54 and the keyboard 56.

The RAM 46 includes a portion designated for scratch pad memory and a portion designated for master key storage. The key generator 52 may comprise any suitable source of randomized digital signals such as the key generators described in U.S. Pat. No. 3,781,473, Pat. No. 4,079,188 and U.S. Pat. No. 4,140,873, assigned to assignee. The key generator 52 is operated by the microprocessor 48 to encipher and decipher digital characters in well known manners. For example, a key is used to determine the starting point of a series of randomized digital characters generated by key generator 52. This series of randomized characters is modulo-2 added with other characters in order to encipher or decipher the characters. This enciphering operation is well known in the literature.

In operation of the system shown in FIG. 1, one of the terminals 10-14 is operated to gain access to the CPU 20 via the concentrator 16. A message is then transferred to the CPU 20 wherein the address of the message is read. The CPU 20 then automatically accesses the RAM 22 and pulls out the desired recipient terminal number and accesses through the I/O port 30 to the automatic dialer. The intended recipient number is then dialed and a data connection established with the intended recipient. If connection cannot be established, the message is stored in message storage 24 and an attempt is made to redial after a predetermined time interval.

At this stage, the system operates to authenticate the recipient in accordance with the present invention. After the reception of a response from the remote station, the CPU 20 asks the authenticator 40 through the I/O port 38 for a go or no go. If the authenticator indicates a go condition, the CPU terminates the desired message to the distant station that will indicate "log on", to indicate that a communication link has been established and then the system is ready to transmit and receive data.

At "log on", the message stored in the message storage 24 is queued up and transmitted. At this stage, the authenticator 40 provides block check characters to enable message authentication according to a technique to be subsequently described.

Figure 2:
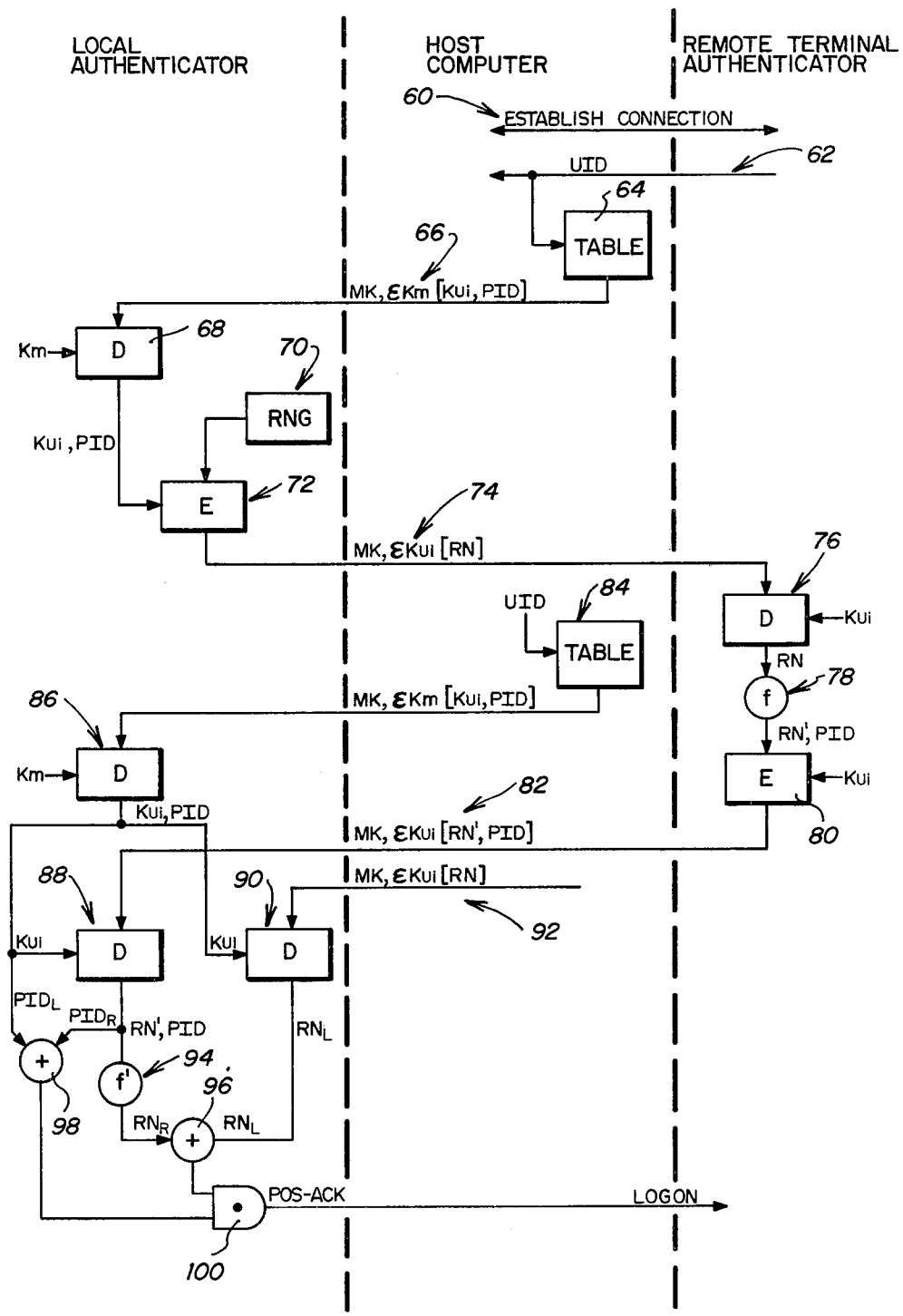
FIG. 2 is a flow diagram illustrating the operation of the circuit of FIG. 1 in performing recipient authentication.

FIG. 2 illustrates the sequential operation of authentication of a desired recipient with the system shown in FIG. 1. FIG. 2 comprises a sequential flow diagram, with sequential steps occurring at the local authenticator 40, at the host computer (CPU 20) and at the remote terminal authenticator. It will be understood that corresponding authenticators will be located at both the transmitting and receiving ends of the communication loop. The operation of the sender authentication technique of the present invention will now be described in accordance with FIG. 2 taken in conjunction with the system shown in FIG. 1.

In accordance with the present invention, encryption is added to the conventional challenge and response technique of authentication in order to thwart the interception of the passwords by a wiretapper or other unauthorized person. By utilizing an encryption device which automatically generates a new starting point in a long stream of randomized digital data, commonly termed a message key, for each message, the same portion of the randomized digital key stream is never used twice. Therefore, even if the password were static, the resulting cipher would never appear the same. Further improvement is made in accordance with the invention by automatically generating the password in a randomized manner and then encrypting the password. By these features, the weaknesses of a static password and interception of the password have been overcome.

Briefly, the technique illustrated in FIG. 2 includes the generation of a random number (RN) by the challenger. This RN is then encrypted to produce an encrypted RN shown as ϵ(RN). The encrypted RN is then transmitted to the recipient as a challenge. The recipient deciphers the encrypted RN to reproduce the clear RN. The recipient then reencrypts the RN, or some function of the RN, to form the response to the challenge. At this stage, it is preferred to perform some function on the RN before reencipherment. The recipient then transmits the response comprising the reencrypted RN' to the challenger. The challenger deciphers the reencrypted RN' and performs the reverse function on the deciphered RN' to obtain RN. The deciphered RN would then be compared with the original challenge. If the deciphered RN is identical to the original challenge, the recipient has been authenticated. The aforementioned challenge response requires identical encryption equipment and basic cryptographic variables being stored at both the challenge and responding stations.

When a host computer is being utilized as with the present system in conjunction with numerous remote terminals, the management of the basic key variables becomes important to the overall security of the system. It is generally desirable that each terminal have a unique cryptographic variable, termed BK, as is required for unique authentication. The host computer must then know the unique BK for each terminal. In accordance with the present invention, the CPU 20 houses in RAM 26 the unique BK in encrypted form for each terminal user. In each message transmitted, a portion of the message, such as an address field, is provided to indicate to the encryption device which BK to use for a particular message.

Another approach used by the invention is the storage of BK for each terminal in a look up table within the host computer. When a message is ready for output, the corresponding BK is then looked up and loaded into the encryption equipment. This technique is implemented in the system shown in FIG. 1 as will be subsequently described.

When BK's are stored in a look up table, a security problem may exist since any computer operator or programmer might extract the BK's and compromise the system. To avoid this, the BK's are generally encrypted before storing in the memory. Therefore, prior to encrypting an RN, the encryption equipment is sent an encrypted BK which it must decipher with a secret master key, termed Km. The system then utilizes the deciphered BK to perform cryptographic operations. This deciphered key is referred to as the user key, termed $KU_i$. The clear form of the user key may be contained within the device and never has to appear in the clear within the host computer storage.

To further enhance the security of the system and to provide the possibility of having multiple uniquely identifiable and therefore authenticatable users at a single location, a personal identity number, termed PID, is added to the password issued by the challenger. The PID may also be stored in the host computer and encrypted with the BK's stored therein. The PID is decrypted at the host encryption unit and stored. The recipient may apend his PID as part of the response to the challenge. The local encrypter at the host computer may then compare the local PID and the remote PID, as well as the RN.

In order to even further improve the security aspects of the system, "anti-spoofing" is implemented. Anti-spoofing is a known technique briefly described in U.S. Pat. No. 4,115,657, assigned to assignee. As is known, if by some means an intruder obtains a copy of plain text and the corresponding cipher text in an enciphering system, the key stream may be mathematically obtained. The reconstructed key stream may then be used to develop a bogus message which might be accepted by an enciphering device as legitimate. Thus, a bogus message could be received. To defeat such an attack, it is necessary to make the key stream a function of the cipher text. This is an approach termed "cipher feedback" or "anti-spoofing." Since the key is a function of the cipher text, if the plain text is altered to become a bogus message, the cipher text changes and hence the key stream changes, thereby thwarting the attack.

To eliminate the possibility of an operator deducing the plain text, the RN transmitted by the challenger is modified before reencrypting it for the response. Even though the cipher is always different due to the randomly generated MK, it is an aspect of the invention not to intentionally transmit identical plain text and therefore the function of the reenciphered RN is generated to change the response.

It will be understood that the present system may be used to provide on-line authentication. However, the authenticators could be strictly off-line and even used for voice authentication, as will be subsequently described.

Referring to FIG. 2, the connection between the host computer and the remote terminal authenticator is established as indicated by the numeral 60. The remote terminal responds with a user identification number, termed UID, at 62. The UID could be the "answer back" on a teleprinter or alternatively could be a number entered by a specific user if multiple uniquely identifiable users operate the same terminal. The UID may comprise a number or alternatively a letter group which is passed in the clear.

The UID is received over lines 36 and applied through the I/O port 30 and a buss 18 to the CPU 20. The UID is used as a table pointer at step 64 (FIG. 2) to locate the address wherein the encrypted user key $KU_i$, shown as $\epsilon KU_i$, is stored. From this address, the user key is extracted from the storage 26 and a message key is extracted from storage, along with an enciphered for the particular user. The PID and $KU_i$ is encrypted under the master key, termed Km. These three parameters are transmitted from the CPU 20 to the local authenticator 40 as shown in FIG. 1. The three parameters are represented at step 66 in FIG. 2 as MK, $\epsilon$ KM ($KU_i$, PID).

The three parameters are transmitted to the authenticator 40 through the I/O port 38 and applied through the parallel interface adapter 42 to the microprocessor 48. The microprocessor 48 utilizes the message key, MK, and the stored master key $K_m$ from RAM 46 to decrypt $\epsilon K_m$ ($KU_i$, PID) in order to obtain $KU_i$ and PID. The decipher step is indicated at step 68 in FIG. 2.

The decode operation at step 68 is initiated by the generation of a command word through the parallel interface adapter 42 that is loaded into the microprocessor 48 to point to a place in the program stored in the RAM 50 to provide the decode routine. The decode routine causes the incoming sequence of characters subsequent to the control word to be loaded into the RAM 46 temporarily in the scratch pad memory until they are all properly received. Then the key generator 52 is loaded with the master key from RAM 46 and instructed to go into the decipher mode and randomized signals are modulo-2 added, or processed according to conventional deciphering techniques, with the stored enciphered characters in order to decipher the characters in the known manner. The deciphered characters are then placed back into the RAM 46 for storage.

The resulting deciphered $KU_i$ is applied through the bus 44 to the key generator 52 and are loaded therein as the new working key. The random key generator 52 is then set up to generate a randomized number. A randomized digital number is then generated at step 70 from the key generator 52 and is temporarily stored in the RAM 46. The message key is then generated, and the random number is pulled out of the RAM 46 and modulo-2 added, or processed according to other conventional enciphering techniques, with the message key to provide an encrypted random character or number as indicated at step 72. It will be understood that the random character RN does not necessarily have to be numeric but could be comprised of alphabetic characters if desired. The message key and the encrypted random number as indicated at step 74 are then transmitted from the authenticator 40 through the I/O port 38, bus 18 and I/O port 30 to the outgoing lines 36 for transmission to the remote terminal. These variables as indicated at 74 are also stored in the RAM 46 for subsequent use.

The message key and encrypted random number are received at the remote, indicator and are deciphered at step 76 utilizing the stored user key $KU_i$. The deciphered random number is then operated upon at step 78 according to a predetermined function, such as reversing the order of the characters or according to a more complex function involving PID. This provides the character RN′. Assuming that PID is appended to the altered RN′, the parameters are enciphered at step 80 with the user key $KU_i$. The message key and the enciphered random number, termed RN′, and PID are transmitted as indicated by numeral 82 from the remote terminal over the communication lines 36 to the system shown in FIG. 1.

At the host computer, the UID is again used as a pointer to a table in the host computer. This is necessary since some time may have elapsed since the user key was deciphered for this user and in the meantime, numerous other terminal responses may have been processed by the host computer. This process is indicated at step 84 and is identical to that performed at step 64 as previously described.

The message key and the enciphered $KU_i$ and PID are applied to the local authenticator 40, wherein they are decrypted utilizing the master key $K_m$ at step 86. The decrypted user key is then loaded back into the key generator 52 to enable decryption of the response from the remote terminal. This decryption is accomplished at step 88 and results in the generation of the altered random number RN' and PID. The response from the remote terminal comprises the message key followed by the encrypted RN' and the encrypted PID.

In the preferred embodiment of the invention, these three parameters represent three groups of five characters each. These characters are loaded into the RAM 46 and the key generator 52 is switched to the decipher mode. The three parameters are then cycled through the key generator 52 under the control of the microprocessor 48 and the deciphered results stored back in the RAM 46. The results now comprise the RN' and PID in the clear, termed $PID_R$.

At step 90, the random number RN that has previously been retained in the host storage (as noted at step 74) is then extracted as indicated in step 92 and deciphered at step 90. The random number which has been stored is a copy of the local random member. The stored message key followed by the encrypted version of the random number is enciphered through the key generator 52 and stored in the RAM 46.

The inverse of the function performed at step 78 is performed at 94 to obtain $RN_R$. $RN_R$ is compared at 96 with $RN_L$. The comparison is performed in the microprocessor 48 in an accumulator by pulling the other word up and placing it in another accumulator. A skip on equal is performed. If the two words are not equal, the skip is not performed and the system falls out into a fail. If the parameters are equal, then another comparison is performed at 98 wherein the local and remote PID's are compared. If both the random numbers and PID's favorably compare, an indication is generated by the step 100 to indicate that a positive acknowledgement has been made and therefore that the remote terminal may log on.

It will be seen that the present system has numerous advantages in that it may be on-line and virtually transparent to the operator, except for the entering of the PID for the respondee. The user keys are never exposed in the clear at the host. The key for a particular user may be changed without changing the keys of the other users. In other words, the master key is not compromised if a respondees user key is compromised. The challenge used by the system is not static, but is random in nature. The challenge is encrypted to provide authentication and prevent spoofing by playback. The present technique provides a PID to extend authentication to the individual level. Comparison and "go-no go" decisions are made in the authentication unit to prevent exposure of PID in the clear. This makes tampering with the software complicated and therefore more secure.

The present system may also be utilized to provide message authentication in order to protect against intentional or accidental alteration of the message through omission, insertion or substitution. Authentication of a message is provided by the present system by extending a technique of error detection as by appending polynomial block-check characters in conjunction with encryption. The particular technique for error detection utilized with the present invention is not critical, as long as the error detection technique has a property of being able to detect errors with a high probability of success. Such techniques as a sixteenth order polynomial used with prior bisynchronous protocol error detection is satisfactory for use with the invention, as is a horizontal and vertical parity scheme. If desired, specially tailored polynomials such as a twenty-fifth order polynomial which may be exactly represented with a single five character Baudot code group may be particularly useful.

With the use of the present technique, the authentication of a message or portion of a message can be accomplished either off-line or on-line. If off-line, the fields of the message must be agreed upon such that the sender and receiver are operating on the same data. If the technique is accomplished on-line, special delimiters are required to indicate to the authenticating device where to begin the accumulation and where to stop. STX and ETX can also be used if the entire message is to be authenticated.

Figure 3:
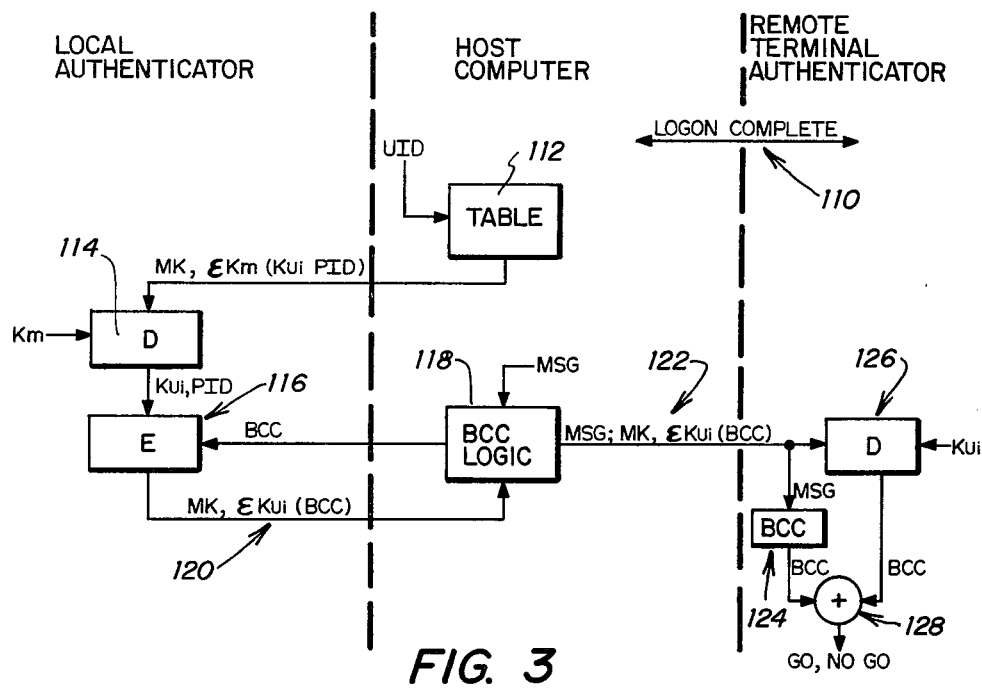
FIG. 3 is a flow diagram illustrating the operation of the circuit of FIG. 1 in performing message authentication.

Assuming that "log on" has been accomplished according to the technique shown in FIG. 2, "log on" is indicated as being complete in FIG. 3 as step 110. At step 112, at the host computer 20, the UID is used to access the key table stored in memory 26 in order to obtain an enciphered user key KUi and a personal identity number PID. The message key and enciphered user key and PID are routed to the authenticator 40 through the parallel interface adapter 42, wherein the message key and enciphered user key are deciphered at step 114 under the master key. As before, the master key is withdrawn from the RAM 46 and utilized in conjunction with the key generator 52 in order to provide deciphering of the parameters. The deciphered user key is then loaded into the key generator 52 at 116. The message to be authenticated is passed through the block check character (BCC) logic program of the CPU 20 at 118 and the resulting block check character is applied to the key generator 52 at step 116.

At 116, the block check character is encrypted with the user key by modulo-2 adding or by other suitable encryption technique. The resulting message key and encrypted block check character is then applied back to the host computer CPU 20 as indicated by step 120 for appendage to the original message, termed MSG. The original message, with the encrypted block check character appended, is transmitted at step 122 to the remote terminal. At 124, the message is passed through block check character logic in order to accumulate the block check character in the known manner. At step 126, the appended encrypted block check character is deciphered. The deciphering occurs at the remote key generator 52, with the user key loaded therein. The deciphered block check character is then compared at 128 with the accumulated block check character. If the two block check characters are identical, a go indication is provided at 128. If the two block check characters are not the same, a no go indication is generated to indicate that the message has not been authenticated.

Figure 4:
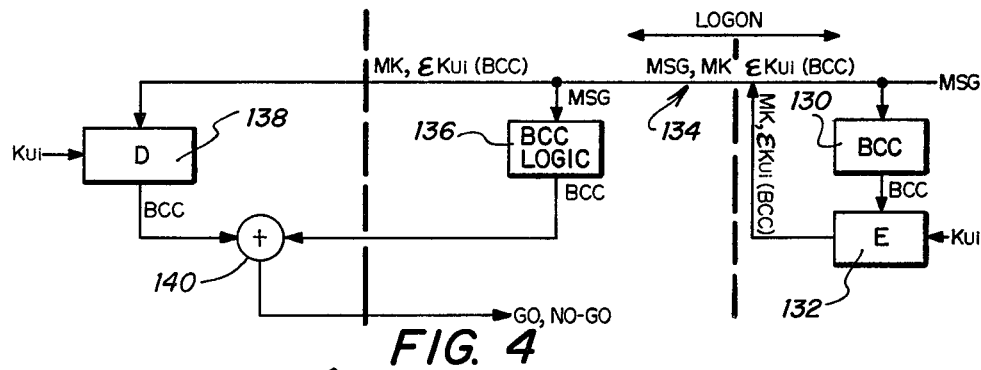
FIG. 4 is a flow diagram illustrating message authentication in the reverse direction.

It may be desirable to authenticate a message being transmitted from the remote terminal to the host terminal. In this case, indication is accomplished in the manner shown in FIG. 4. After log on, the message is applied through a block check character logic at 130 in order to accumulate the block check character (BCC). The block check character is enciphered at 132 under the user key. The resulting message key and enciphered block check character is appended to the message and transmitted at step 134 to the host computer. The enciphered BCC is applied through a BCC logic at 136 in order to derive the original block check character. The message key and enciphered block check character are deciphered at 138 under the control of the stored user key. The resulting block check characters are compared at 140. If the two block check characters are identical, a go indication is generated in order to indicate an authenticated message. If the two block check characters do not compare, a no go indication is generated to indicate an unauthenticated message.

It should be noted that message authentication provides a defactor sender authentication, since only the legitimate sender should have access to an authenticator with the correct key variable. If the message is prepared separately from the terminal, dual security control is obtained as the operator alone cannot dispense authenticated traffic.

Figure 5:
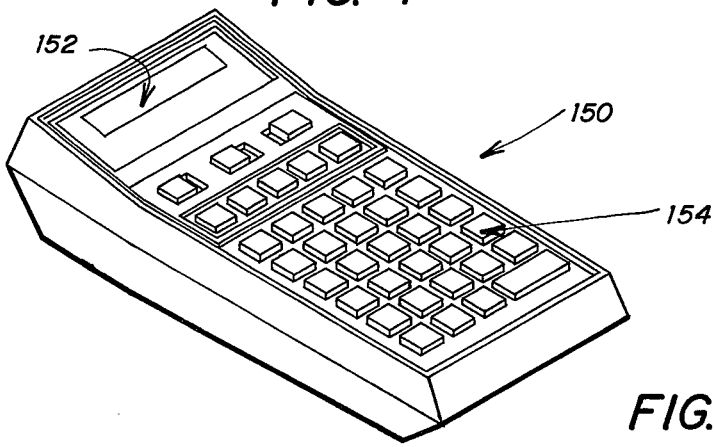
FIG. 5 is a perspective view of a hand-held enciphering machine which may be used to perform the present method.

Although the present technique has been disclosed with reference to the computer system of FIG. 1, it will be understood that the present technique can be implemented by the use of other types of terminals. FIG. 5 illustrates a hand-held encryption device generally identified by the numeral 150 which may used, in combination with an identical hand-held terminal at a remote location, to implement the present invention. The hand-held enciphering unit 150 shown in FIG. 5 is described in detail in the copending patent application Ser. No. 901,068, filed Apr. 28, 1978, by Barrie O. Morgan et al, entitled Portable Electronic Cryptographic Device, and assigned to the present assignee.

As indicated in the copending patent application, hand-held enciphering unit includes a display 152 on which clear and enciphered characters may be displayed by proper operation of a keyboard 154. In basic operation of the hand-held unit, various master keys and codes for the day may be input into and stored in both the local and remote units of the system. A clear text message is typed into the keyboard 154 of the unit 150 and is displayed on the display 152. Depression of the enciphering key automatically changes the displayed clear text into enciphered text. The text may be deciphered by the unit in a similar manner.

Assuming that identical hand-held devices 150 shown in FIG. 5 are located both at the local station and at the remote station and that the proper master keys and codes for the day are established in both units, the operation of the system will now be described. A randomized number is chosen either from a list of randomized numbers or through an automatic randomized number key button designated on the device. If the key button is used, the randomized number key button is depressed and the resulting random key is displayed on the display 152. The proper encryption button is then depressed in order to encipher the randomized number. Assuming that five digits are utilized for the randomized number and five digits for the message key, ten numbers comprise the message key and the encrypted random number. These numbers may be transmitted by mail or by teleprinter to the remote station or read out to the remote station by voice over the telephone.

At the remote station, the ten characters are received. The first five character group is loaded into the hand-held enciphering device as a message key. The hand-held deciphering system is placed in the decode mode and the encrypted random number is loaded in and decrypted. The original number would then be provided. The operator then would reverse the digits or perform some other preestablished simple function on the random number. The random number is then entered back into the hand-held unit and displayed on display 152. The encipher key is then pushed and the random number is again reencrypted. This reencrypted number is then read over the telephone or sent by letter or other technique to the host station. The reencrypted random number is then again deciphered. The deciphered number is then compared with the original random number sent to provide authentication in accordance with the present invention.

It will be understood that the hand-held unit shown in FIG. 5 could be programmed to provide automatic authentication in accordance with the invention. A telephone conversation could be implemented between two remote parties. A challenge button may be provided on the device which automatically generates a random number, encrypts the random number and displays the encrypted random number. The encrypted random number could then be read over the telephone to the remote party. The remote device could then be operated to receive the encrypted random number and to decode the number. Further, the device could then automatically perform the reverse or other predetermined function on the number, reencipher it and display it so that it may again be sent back over the telephone. The receive number could then be deciphered and compared with the original random number to indicate that the recipient has been authenticated. It will be understood that message authentication could be conducted in the same manner.

It will thus be seen that the present invention provides both recipient and message authentication according to an extremely secure system which has utility in banks, businesses, governmental uses and the like when it is desirable that only a predetermined party receive a message and to insure that the proper message is received.

Whereas the present invention has been described with respect to specific embodiments thereof, it will be understood that various changes and modifications will be suggested to one skilled in the art, and it is intended to encompass such changes and modifications as fall within the scope of the appended claims.

We claim:
1. A system for authenticating a message recipient prior to transmission of a message between an authenticator station and the message recipient comprising:
   means for transmitting a user identification signal from said message recipient to said authenticator station,
   means for producing an enciphered user key and a message key in response to said user identification signal,
   means for deciphering the enciphered user key using a predetermined master key,
   means for generating a random character,
   means for enciphering said random character in response to said deciphered user key, means for storing said message key and said enciphered random character, means for transmitting said message key and said enciphered random character to said message recipient, means for receiving said enciphered random character and said message key at said message recipient location, means for deciphering said enciphered random character in response to said user key, means for varying said random character in a predetermined manner, means for enciphering said varied random character, means for transmitting said enciphered varied random character to said authenticator station, means for deciphering said enciphered varied random character in response to said user key, means for varying said deciphered varied random character in the inverse as said predetermined manner, to provide a first random number, means for deciphering said stored enciphered random character to provide a second random number, means for comparing said first and second random numbers, and means for generating an authenticate indication if said first and second random numbers favorably compare.

2. The system of claim 1 and further comprising a system for authenticating said message after transmission to said message recipient comprising:

means responsive to said message for accumulating polynomial block check characters, means for enciphering said block check characters according to a predetermined enciphering scheme, means for transmitting said enciphered block check characters according t a predetermined enciphering scheme, means for transmitting said enciphered block check characters along with said message to said message recipient, means at the location of said message recipient for receiving said message and for accumulating polynomial block check characters in response thereto, means for deciphering said enciphered block check characters according to the reverse of said predetermined enciphering scheme, means for comparing said accumulated block check characters and said deciphered block check characters, and means responsive to said comparing means for generating an authentication indication if said accumulated and deciphered block check characters are identical.

3. The system of claim 2 and further comprising:

transmitting a user identification signal from said message recipient, in response to said user identification signal, producing an enciphered user key and message key, deciphering the enciphered user key using a predetermined master key, and enciphering said block check characters in dependence upon said deciphered user key.

4. The system of claim 2 wherein said polynomial block check characters have the property of being able to determine errors with a high degree of probability.

5. A method for authenticating a message recipient prior to transmission of a message comprising:

establishing communication between an authenticator station and the message recipient, transmitting a user identification signal from said message recipient to said authenticator station, in response to said user identification signal, generating an enciphered user key and a message key, deciphering the enciphered user key using a predetermined master key, generating a random character, in response to said deciphered user key, enciphering said random character, storing said message key and said enciphered random character, transmitting said message key and said enciphered random character to said message recipient, receiving said enciphered random character and said message key at said message recipient location, deciphering said enciphered random character in response to said user key, varying said random character in a predetermined manner, enciphering said varied random character, transmitting said enciphered varied random character to said authenticator station, deciphering said enciphered varied random character in response to said user key, varying said deciphered varied random character in the inverse as said predetermined manner, to provide a first random number, deciphering said stored enciphered random character to provide a second random number, comparing said first and second random numbers, and generating an authenticate indication if said first and second random numbers favorably compare.

6. The method of claim 5 and further comprising:

generating a personal identification signal in response to said user identification signal, enciphering said personal identification signal and storing same with said enciphered random character, appending said personal identification signal to said varied random character at said message recipient location, enciphering said personal identification signal, transmitting said personal identification signal to said authenticator station, receiving and deciphering said personal identification signal at said authenticator station to produce a first personal identification signal, retrieving and deciphering said stored enciphered personal identification signal to produce a second personal identification signal, comparing said first and second personal identification signals, and allowing the generation of said authenticate indication only if said comparison is favorable.

7. The method of claim 5 and further comprising:

transmitting a message to said message recipient, in response to said message, accumulating polynomial block check characters, enciphering said block check characters according to a predetermined enciphering scheme, transmitting said enciphered block check characters along with said message to said message recipient, receiving said message and accumulating polynomial block check characters in response thereto, deciphering said enciphered block check characters according to the reverse of said predetermined enciphering scheme, comparing said accumulated block check characters and said deciphered block check characters, and generating an authentication indication in response to said comparison if said accumulated and deciphered block check characters are identical.

* * * * *

UNITED STATES PATENT AND TRADEMARK OFFICE
CERTIFICATE OF CORRECTION

PATENT NO.   :   4,349,695
DATED        :   September 14, 1982
INVENTOR(S)  :   Barrie O. Morgan et al.

It is certified that error appears in the above-identified patent and that said Letters Patent is hereby corrected as shown below:

Column 3, line 61, "the CPU terminates" should read
    -- the CPU transmits --.

Column 7, line 34, "local random member" should read
        -- local random number --.

Column 9, line 22, "defactor" should read -- defacto --.

Signed and Sealed this

Third Day of January 1984

[SEAL]

Attest:

GERALD J. MOSSINGHOFF

Attesting Officer

Commissioner of Patents and Trademarks